United States Patent [19]

Pegels et al.

[11] 4,022,255

[45] May 10, 1977

[54] METHOD FOR FILLING A REACTOR WITH SOLID PARTICLES

[75] Inventors: Abraham A. Pegels, The Hague; Hendrik J. Scheffer, Amsterdam, both of Netherlands

[73] Assignee: Shell Oil Company, Houston, Tex.

[22] Filed: Oct. 17, 1975

[21] Appl. No.: 623,272

[30] Foreign Application Priority Data

Oct. 17, 1974 Netherlands ............... 7413636

[52] U.S. Cl. ............................ 141/1; 23/288 R; 214/17 C
[51] Int. Cl.² ............................................. B65B 1/04
[58] Field of Search .......... 23/288 R, 288 S, 288 E; 137/575; 141/1, 9, 11, 13, 67, 71, 73, 74, 80, 100, 102, 325; 208/120, 134; 209/133, 138, 139 R, 10, 477; 302/14–16, 66; 214/17 A, 17 C; 423/659 F

[56] References Cited

UNITED STATES PATENTS

| | | | |
|---|---|---|---|
| 2,902,434 | 9/1959 | Burton et al. | 208/134 |
| 3,392,110 | 7/1968 | Payne | 208/120 |

*Primary Examiner*—Richard E. Aegerter
*Assistant Examiner*—Frederick R. Schmidt

[57] ABSTRACT

A method for filling a reactor with one or more beds of solid homogeneous particles, the method being characterized by the incipient fluidization of the solid particles.

6 Claims, 1 Drawing Figure

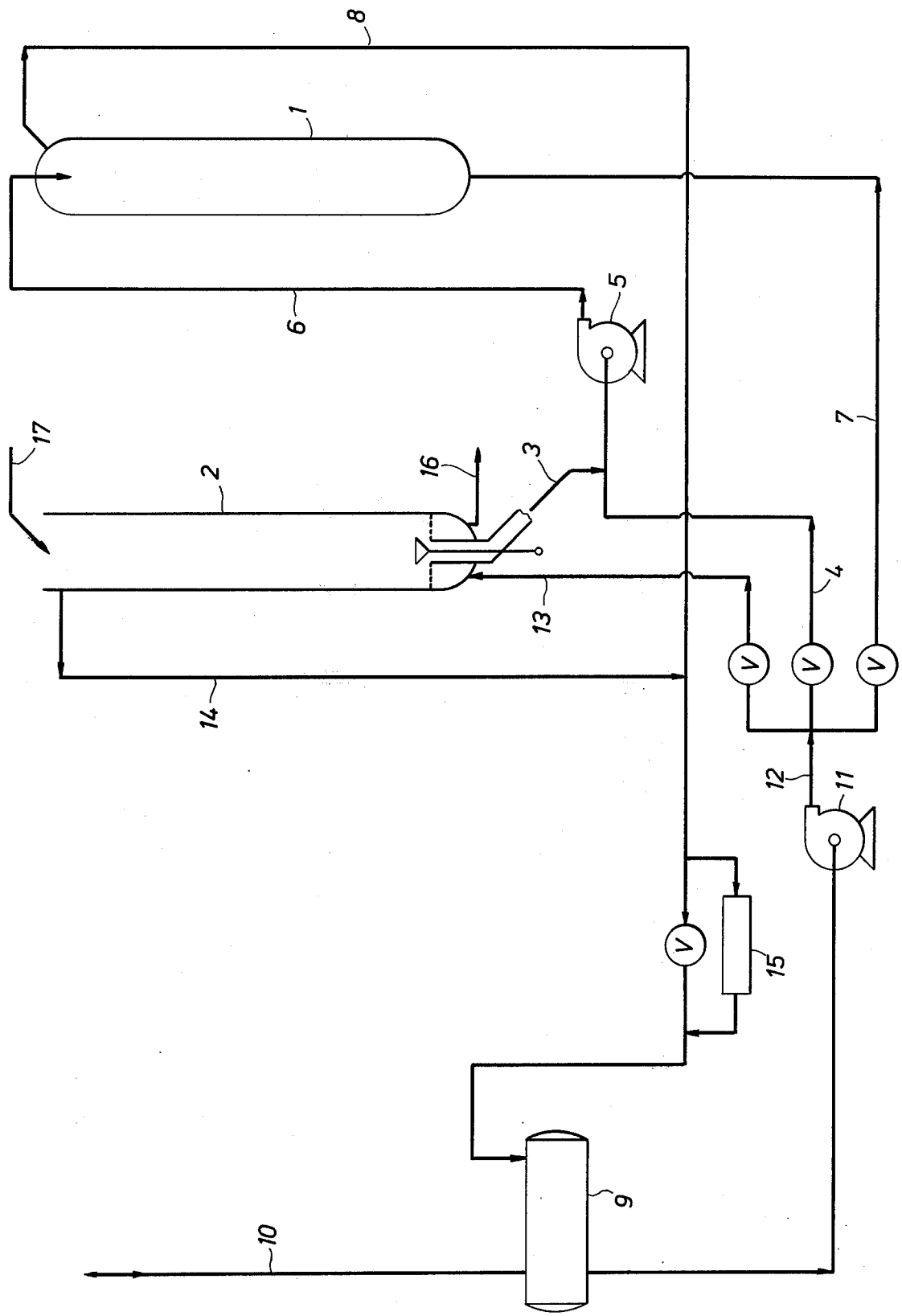

METHOD FOR FILLING A REACTOR WITH SOLID PARTICLES

BACKGROUND OF THE INVENTION

The invention relates to a method for filling a reactor with one or more homogeneous beds of solid particles, particularly catalyst particles.

In general, in the application of reaction systems in which liquids and/or gases are passed over a particulate catalyst, it is normally important that the catalyst particles are present in one or more homogeneous beds. By "homogeneous bed" is meant a bed having a uniform packing and an arbitrary orientation of the catalyst particles. Homogeneous beds are advantageous, in that a regular flow through the catalyst bed and an optimum degree of wetting of catalyst particles by the reaction mixture are obtained. Moreover, no reaction mixture leaves the reactor without having contacted the catalyst, or after too brief a contact period.

Difficult as the filling of relatively small reactors with a homogeneous bed of catalyst particles (usually consisting of small cylinders) is, it can be carried out by pouring the catalyst particles carefully, or by introducing a slurry of the catalyst particles in a liquid, into the reactor. However, much greater problems arise when large reactors (for example, cylindrical reactors having a diameter exceeding 2 meters and a height exceeding 10 meters) have to be filled with one or more homogeneous beds of catalyst particles. Large reactors of this type can be used, for example, in processes for the hydrodesulfurization of mineral oil fractions, in particular of crude mineral oil or residues obtained by removing at least part of the volatile products from a crude mineral oil. The invention solves the problems associated with filling such reactors, and provides a method by which a reactor can be filled in a suitable manner with one or more homogeneous beds of solid particles, particularly catalyst particles.

SUMMARY OF THE INVENTION

According to the invention, the solid particles in the reactor are brought into a state of incipient fluidization by means of a liquid stream, after which the rate of flow of the liquid stream is decreased or discontinued and the particles are allowed to settle. The term "fluidization" indicates that the solid particles are suspended in a liquid. By the use of a liquid stream, the solid particles are prevented from settling; they are in a fluidized bed. As those skilled in the art are aware, the volume of a fluidized bed will exceed the volume of the bed formed by the fully settled particles. As used herein, the term "expansion" of the fluidized bed refers to the dimensions by which the volume of the fluidized bed exceeds the volume of the bed formed by the fully settled catalyst particles. Again, the term "incipient fluidization," as used herein, indicates that the degree of this expansion is low, i.e. below 10%, preferably below 5%. It will be clear that the lower the degree of expansion of the fluidized bed, the more complete the filling of the reactor will be after the settling of the catalyst particles (and consequently the less empty space will be present in the reactor). The rate of flow of the liquid stream which must be applied in order to maintain catalyst particles of a given type having given dimensions in a state of incipient fluidization must be predetermined in model tests. For example, in the case of conventional extruded hydrodesulfurization catalysts comprising cobalt and molybdenum on low-silica alumina, having a particle density of 1.2 tons/m$^3$ (pores filled with air) and diameters of from 0.8 mm to 1.5 mm, flow rates (using gas oil as the fluidizing liquid) of 3.35 mm/sec. to 6 or 7 mm/sec. may be used. As will be apparent to those skilled in the art, suitable flow rates can be determined in laboratory apparatus by plotting the pressure drop per meter of catalyst bed against flow rate. At the moment the pressure drop remains constant, fluidization begins.

One manner of filling an empty reactor is to load the reactor in advance with solid particles and introduce a liquid stream in order to bring the particles into a state of incipient fluidization. However, filling the reactor with solid particles (for example by means of a hopper) is a time-consuming operation, and a high degree of breakage of the solid particles will occur. Therefore, the solid particles are preferably introduced into the reactor as a slurry in a liquid. While the solid particles, which may or may not be in the form of a slurry, are being introduced, the liquid stream to bring the particles into a state of incipient fluidization may or may not be maintained. If the liquid stream is maintained, which is preferred, during the filling with the solid particles, the latter are very suitably supplied at the top of the reactor.

The invention is particularly applicable to reactors containing one or more conical grates for the solid particles, so that a bed of solid particles can be formed on each grate. For example, a reactor of this type is described in Netherlands patent application No. 7401733, filed Feb. 8, 1974. The conical grates have a central opening through which the solid particles can descend when the reactor has to be emptied, and the inclination of the grates is preferably such that the solid particles can leave the reactor under the influence of gravity when the reactor has to be emptied.

According to the invention, during the filling of a reactor the solid particles are brought into a state of incipient fluidization by means of a liquid stream. In order to fill the spaces below the grates as well as possible, it is advantageous to decrease the rate of flow of the liquid stream once or several times for a short period shortly before reducing this rate of flow or discontinuing the liquid stream.

In general, the type of liquid stream supplied to fluidize the particles is not critical, so long as the stream, under the conditions supplied, is inert in regard to the particles, e.g., is non-reactive with or does not have a significant solubility for the particles, and is capable of fluidizing, i.e., suspending the particles. The selection of an appropriate liquid, given these criteria, is within the ability of those skilled in the art. However, the liquid stream used is preferably a stream of a petroleum-based product. In order to avoid attrition, it is preferable that the liquid stream chosen be somewhat viscous. For example, water and gasoline do not appear to be suitable, while gas oil and heavier pertroleum-based liquids or mineral oils are most attractive. As indicated, the suitability of a given liquid stream, given the above criteria, may readily be determined by routine testing.

Although it is possible to supply fresh liquid continuously in order to bring the solid particles into a state of incipient fluidization, the liquid will normally be recycled. The liquid stream is very suitably introduced at the bottom of the reactor at the desired rate, and is discharged at the top of the reactor, preferably at a place where solid particles are no longer present in the liquid.

When all the solid particles to be introduced are in a state of incipient fluidization, the rate of flow of the liquid stream is reduced, or the stream is discontinued, and the particles are allowed to settle. After settling, the liquid can optionally be discharged or replaced by another liquid. In certain cases, the same liquid used for the fluidization can be passed at elevated temperature and/or pressure over the homogeneous catalyst bed now obtained in order to give the catalyst an active form (for example a sulfided form for desulfurization catalysts based on supported metals of Group VI and/or Group VIII).

To obtain a solid-particle bed which does not show a very high pressure drop when a liquid to be converted by these particles is passed over the bed, it is advantageous that the dimensions of the solid particles remain within narrow limits. The presence of fines and solid particles having smaller dimensions than desired should be avoided, since such smaller particles can clog the passage in the bed and consequently cause a substantial pressure drop. However, in the production of catalyst particles, for example, by extrusion, breakage usually occurs during their further treatment (transport, pouring etc.), which results in the formation of smaller particles, while a quantity of pulverulent material (fines) is always present.

In order to avoid the pressure drop problem, suitable steps may be taken to eliminate the fines and undersize particles and provide a bed of particles whose dimensions are uniform within narrow limits. The solid particles, the dimensions of which lie within narrow limits, are preferably obtained by fluidizing a mixture consisting of particles the dimensions of which lie within narrow limits and of particles having smaller dimensions in a liquid until the particles of smaller dimensions have accumulated in an upper layer, then discontinuing the fluidization and removing the upper layer of settled particles, which layer consists of particles having smaller dimensions. Preferably, the smaller particles are removed by suction. During the fluidization, which is very suitably performed in a supply zone, e.g. a tank or tanks, the fines usually do not settle, but are entrained by the liquid and removed from the supply tank. Before supplying the fluidization liquid again, e.g. at the bottom of a supply tank, the fines are very suitably removed by filtration. The use of a supply tank or tanks moreover has the great advantage that the tank supply can be used as storage space for the solid particles. After the solid particles, the dimensions of which lie within narrow limits, have been obtained in the supply tank, they can be supplied to the reactor at any desired moment, preferably as a slurry, as described previously. When the solid particles in the reactor have to be replaced, the operation can be carried out very rapidly. The reactor is emptied and then, according to the invention, is filled from the supply tank with particles the dimensions of which lie within narrow limits, which operation can be carried out in a few hours. In the absence of the invention, when the reactor has to be filled with solid particles which have not been collected in advance in a supply tank or otherwise, the filling operation may take many days for the case of a reactor of large dimensions. The supply zone should have a volume of the same order of size (preferably somewhat larger) as that of the reactor.

The solid particles are very suitably catalyst particles, in particular catalyst particles which can be used for the demetallization and/or hydrodesulfurization of crude mineral oil or residues. As used herein, the term "mineral oil" is understood to include petroleum, shale oil, rock oil, oil obtained from tar sands, and similar hydrocarbon-based natural oils present in the earth's crust. The particles preferably contain one or more metals of Group(s) VI and/or VIII of the periodic system or compounds thereof on an oxidic carrier; in particular catalyst particles consisting of one or more oxides and/or sulfides of cobalt, nickel, molybdenum and tungsten on a carrier consisting completely or predominantly of alumina and/or silica are very suitable. The solid particles are preferably extrudates. Very suitably they have a diameter of 0.5–3 mm and a length of 3–7 mm. The demetallization and/or hydrodesulfurization of, for example, a crude mineral oil or a residue can be carried out in the reactor under conditions known per se, such as temperatures of 385°–445° C, hydrogen pressures of 75–225 kg/cm$^2$ and space velocities of 0.5–5 parts by weight of feed per part by volume of catalyst.

DETAILED DESCRIPTION OF THE INVENTION

In the drawing, numeral 1 designates a reactor which can be filled with catalyst particles from a supply tank 2. The particles can leave the supply tank 2 through a line 3, be mixed with liquid (for example gas oil) supplied through a line 4, and then can be supplied at the top of the reactor 1 through line 6 by means of a slurry pump 5. At the same time, liquid can be supplied at the bottom of reactor 1 through a line 7 at such a rate that the catalyst particles are brought into a state of incipient fluidization. Line 8 serves to discharge liquid at the top of the reactor. Through line 8 liquid can be supplied to a reservoir 9 which is provided with a vent line 10. A pump 11 serves to pump liquid from the reservoir 9 to lines 4 and 7 through a line 12. The supply tank 2 comprises a solid-particle inlet 17, a liquid inlet 13 (which is closed when the reactor 1 is filled) through which, when lines 3, 4 and 7 are closed, liquid can be pumped from the reservoir 9 to the supply tank 2 through line 12 by means of pump 11. The top of the supply tank 2 is provided with a discharge line 14 through which liquid can be recycled to the reservoir 9. If desired, fines can be removed from the liquid in line 14 by means of filter device 15. A line 16 is present at the bottom of the supply tank to remove liquid completely or substantially completely from the supply tank, which operation can be performed when the tank has been filled with solid particles the dimensions of which lie within narrow limits. The following non-limiting examples illustrates the practice of the invention with regard to the scheme shown in the drawing.

EXAMPLE

A reactor 1 (height 23 m, diameter 3.4 m) is filled with 170 m$^3$ of extruded cobalt-molybdenum on alumina (low-silica) catalyst particles having an average diameter of 1.5 mm, an average length of 5 mm, and a particle density (pores filled with air) of about 1.2 tons/m$^3$. The catalyst particles are supplied from the supply tank 2 (height 26 m, diameter 3.4 m) through a pipe 3, pump 5 and line 6, at a rate of 15 tons/h by means of gas oil which is supplied through the line 4 at a rate of 223 m$^3$/h. Through the line 7 gas oil is supplied to the reactor 1 at a rate in the reactor of 7 mm/sec., with the result that the particles in the reactor are brought into a state of incipient fluidization. From the top of the reactor gas oil is recycled to reservoir 9 through the line 8. When the required quantity of catalyst particles is in the reactor and is in a state of incipient fluidization, the rate of flow of the gas oil is then briefly decreased three times and discontinued. If desired, the gas oil present in the reactor can be discharged.

The particles to be transported to the reactor from the supply tank 2 are obtained in the following manner. The supply tank is filled with catalyst particles, for example, from drums, through the inlet 17. Fines and smaller particles are removed therefrom by fluidizing the contents of the supply tank by means of gas oil which is supplied via the line 13 at a rate in the supply tank of 9 mm/sec. Gas oil is discharged through the line 14 at the top of the supply tank and passed to the reservoir 9 after filtration in the filter device 15. The supply of gas oil is terminated after about 3 hours and the gas oil is discharged from the supply tank. Particles of smaller dimensions, which have collected in the upper layer of the contents of the supply tank, are subsequently removed by means of large vacuum cleaner.

What is claimed is:

1. A process for filling a reactor with at least one homogeneous bed of solid particles, the dimensions of which lie within narrow limits, which comprises:
    a. fluidizing in a supply zone a mixture consisting of particles the dimensions of which lie within narrow limits and of particles having smaller dimensions in an inert fluidizing liquid until the particles of smaller dimensions have accumulated in an upper layer or layers in the supply zone;
    b. stopping the fluidization and allowing the particles to settle;
    c. removing the upper layer or layers of the settled particles;
    d. introducing at least part of the remainder of the settled particles in the supply zone as a slurry in an inert liquid into a reactor, and bringing the introduced particles into a state of incipient fluidization by means of an inert fluidizing liquid stream;
    e. reducing or discontinuing the rate of flow of the inert fluidizing liquid stream; and
    f. allowing the particles to settle.

2. A process for filling a reactor with at least one homogeneous bed of solid catalyst particles, the dimensions of which lie within narrow limits, which comprises:
    a. fluidizing in a supply zone a mixture consisting of particles the dimensions of which lie within narrow limits and of particles having smaller dimensions in an inert fluidizing liquid until the particles of smaller dimensions have accumulated in an upper layer or layers in the supply zone;
    b. stopping the fluidization and allowing the particles to settle;
    c. removing the upper layer or layers of the settled particles;
    d. introducing at least part of the remainder of the settled particles in the supply zone as a slurry in an inert fluidizing liquid into a reactor, and bringing the introduced particles into a state of incipient fluidization by means of a liquid stream;
    e. reducing or discontinuing the rate of flow of the inert fluidizing liquid stream; and
    f. allowing the particles to settle.

3. The process of claim 1 wherein the fluidizing liquid is gas oil.

4. The process of claim 2 wherein the fluidizing liquid is gas oil.

5. The process of claim 2 wherein the fluidizing liquid is a petroleum-based product.

6. The process of claim 2 wherein the fluidizing liquid is a heavy mineral oil.

* * * * *